(12) United States Patent
Nagata et al.

(10) Patent No.: US 6,258,484 B1
(45) Date of Patent: Jul. 10, 2001

(54) ANODE MATERIAL FOR USE IN ALKALINE MANGANESE CELLS AND PROCESS FOR PRODUCING THE SAME

(75) Inventors: Hideki Nagata, Yokohama; Masayoshi Matsumoto; Kenji Ichiya, both of Akita; Kazuya Saito, Honjo, all of (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/046,333

(22) Filed: Mar. 23, 1998

(51) Int. Cl.⁷ ........................................ H01M 4/42
(52) U.S. Cl. .................. 429/229; 429/206; 429/232
(58) Field of Search .................. 429/206, 229, 429/232

(56) References Cited

U.S. PATENT DOCUMENTS

| | | | |
|---|---|---|---|
| 5,168,018 | * 12/1992 | Yoshizawa et al. | 429/190 |
| 5,308,374 | * 5/1994 | Yoshizawa et al. | 29/623.1 |
| 5,348,816 | * 9/1994 | Shinoda et al. | 429/205 |
| 5,425,798 | * 6/1995 | Sasaki et al. | 75/347 |
| 5,541,021 | * 7/1996 | Watanabe et al. | 429/206 |
| 5,721,068 | * 2/1998 | West et al. | 429/190 |
| 5,773,176 | * 6/1998 | Serenyl | 429/231 |

FOREIGN PATENT DOCUMENTS 457354 11/1991 (EP) .

WO 94/19502 * 9/1994 (WO) .............................. C22C/18/00

OTHER PUBLICATIONS

*Patent Abstracts of Japan*, vol. 010, No. 236 (E–428) Aug. 15, 1986 of JP 61 068862 A (Fuji Electrochem Co Ltd), Apr. 9, 1986.

*Patent Abstracts of Japan*, vol. 013, No. 109 (E–727), Mar. 15, 1989 of JP 63 281356 A (Fuji Electrochem Co Ltd), Nov. 17, 1988.

*Patent Abstracts of Japan*, vol. 016, No. 008 (E–1152), Jan. 10, 1992 of JP 03 230476 A (Mitsui Mining & Smelting Co Ltd), Oct. 14, 1991.

* cited by examiner

*Primary Examiner*—Carol Chaney
(74) *Attorney, Agent, or Firm*—Frishauf, Holtz, Goodman, Langer & Chick, P.C.

(57) ABSTRACT

Metallic zinc melted to a purity of 99.995% or higher was treated with selected elements that were dissolved in amounts within specified ranges and the resulting melts were atomized to prepare zinc alloy powders of 35–200 mesh; the powders were gelled with a gelling agent (sodium polyacrylate) and an electrolyte; bismuth compounds having specified powder characteristics (either an average particle size of no more than 10 $\mu$m or a specific surface area of at least 1 $m^2/g$ or both characteristics) were added in specified amounts to the gels, thereby producing gels of anode.

18 Claims, No Drawings

ANODE MATERIAL FOR USE IN ALKALINE MANGANESE CELLS AND PROCESS FOR PRODUCING THE SAME

BACKGROUND OF THE INVENTION

1. Field of the Invention

This invention relates to anode materials or anode active materials for use in alkaline cells, as well as zinc alloy powders to make up said anode materials.

2. Background Information

Zinc has been favored as an anode material to be used in alkaline dry cells and other types of cells on account of its high hydrogen overvoltage and low cost. However, it has been difficult to fully suppress the evolution of hydrogen gas from the alkaline dry cells using zinc as an anode material and this has caused electrolyte leakage as a secondary problem.

The conventional methods of suppressing the evolution of hydrogen gas are mostly based on the selection of an optimal composition of zinc alloys, the application of a surface treatment to zinc particles and the addition of corrosion inhibitors to the electrolyte.

To make zinc alloys, bismuth, indium, aluminum and other elements are combined with zinc but even alloy compositions based on such combinations are not optimal for providing enhanced corrosion resistance and the zinc alloy powder which is an anode material will discharge by itself to evolve hydrogen gas during storage, whereupon the pressure in the dry cell increases to cause electrolyte leakage.

With a view to inhibiting the corrosion of zinc alloys, it has been proposed that indium compounds such as indium oxide and indium hydroxide or bismuth compounds such as bismuth oxide and bismuth hydroxide be added to a gel of the zinc powder. However, in order to have these compounds exhibit the corrosion inhibiting effect to the fullest extent, either type of compounds must be added in amounts of several hundred ppm and more but this results in overdoping and the internal resistance of the zinc alloy will so much increase as to cause adverse effects on the discharging performance of the cell.

An object, therefore, of the present invention is to provide an anode active material and an anode material for use in mercury-free alkaline manganese cells which are adapted to evolve a smaller amount of hydrogen gas than in the prior art by means of improving the physical characteristics of the corrosion inhibitor they use and by specifying the composition of the zinc alloy powder they are based upon.

The present inventors conducted intensive studies with a view to attaining the stated object. As a result, they found that by means of adding specified amounts of metals and by adding specified amounts of metallic bismuth or bismuth compounds having specified physical characteristics when preparing a gel of anode, the characteristics of the anode gel were improved to achieve a substantial reduction of hydrogen gas evolution both before and after discharge, particularly after the discharge. The present invention has been accomplished on the basis of this finding.

SUMMARY OF THE INVENTION

Firstly, the invention relates to an anode active material for use in alkaline manganese cells which has a bismuth compound added to a zinc alloy powder in an amount of 0.0001–0.1 wt %. The term "a bismuth compound" herein used includes metallic bismuth and a compound which contains bismuth.

Secondly, the invention relates to an anode active material for use in alkaline manganese cells which is characterized in that a bismuth compound selected from the group consisting of metallic bismuth, bismuth oxide and bismuth hydroxide is added to a zinc alloy powder in an amount of 0.0001–0.1 wt %.

Thirdly, the invention relates to an anode active material for use in alkaline manganese cells characterized in that a bismuth compound having either an average particle size of no more than 10 $\mu$m or a specific surface area of at least 1 $m^2/g$ or both characteristics is added to a zinc alloy powder in an amount of 0.0001–0.1 wt %.

Fourthly, the invention relates to an anode active material for use in alkaline manganese cells characterized in that a zinc alloy powder alloyed by addition of at least one alloying component selected from the group consisting of Al, Bi, In and Pb has a bismuth compound added thereto in an amount of 0.0001–0.1 wt %.

Fifthly, the invention relates to an anode active material for use in alkaline manganese cells characterized in that a zinc alloy powder alloyed by addition of at least one alloying component selected from the group consisting of 0.001–0.01 wt % of Al, 0.001–0.05 wt % of Bi, 0.01–0.1 wt % of In and 0.01–1.0 wt % of Pb has a bismuth compound added thereto in an amount of 0.0001–0.1 wt %.

Sixthly, the invention relates to a gel of anode material for use in alkaline manganese cells produced by mixing under agitation a zinc alloy powder with an electrolyte made of an aqueous potassium hydroxide solution, a gelling agent and a bismuth compound, said zinc alloy powder being prepared by atomizing a melt composed of purified molten zinc alloyed with one or more alloying components.

Seventhly, the invention relates to a gel of anode material for use in alkaline manganese cells produced by mixing under agitation zinc alloy powder with an electrolyte made of an aqueous potassium hydroxide solution, a gelling agent and at least one bismuth compound selected from the group consisting of metallic bismuth, bismuth oxide and bismuth hydroxide, said zinc alloy powder being prepared by atomizing a melt composed of purified molten zinc alloyed with one or more alloying components.

Eighthly, the invention relates to a gel of anode material for use in alkaline manganese cells produced by mixing under agitation a zinc alloy powder with an electrolyte made of an aqueous potassium hydroxide solution, a gelling agent and a bismuth compound having either an average particle size of no more than 10 $\mu$m or a specific surface area of at least 1 $m^2/g$ or both characteristics, said zinc alloy powder being prepared by atomizing a melt composed of purified molten zinc alloyed with one or more alloying components.

Ninthly, the invention relates to a gel of anode material for use in alkaline manganese cells produced by mixing under agitation a zinc alloy powder with an electrolyte made of an aqueous potassium hydroxide solution, a gelling agent and a bismuth compound, said zinc alloy powder being prepared by atomizing a melt composed of purified molten zinc alloyed with at least one alloying component selected from the group consisting of Al, Bi, In and Pb.

Tenthly, the invention relates to a gel of anode material for use in alkaline manganese cells produced by mixing under agitation a zinc alloy powder with an electrolyte made of an aqueous potassium hydroxide solution, a gelling agent and a bismuth compound, said zinc alloy powder being prepared by atomizing a melt composed of purified molten zinc alloyed with at least one alloying component selected from the group consisting of 0.001–0.01 wt % of Al, 0.001–0.05 wt % of Bi, 0.01–0.1 wt % of In and 0.01–1.0 wt % of Pb.

Eleventhly, the invention relates to a zinc alloy powder for an anode material in alkaline manganese cells prepared by atomizing a melt composed of purified molten zinc alloyed with one or more elements selected from the group consisting of 0.001–0.01 wt % of Al, 0.001–0.05 wt % of Bi, 0.01–0.1 wt % of In and 0.01–1.0 wt % of Pb.

Twelfthly, the invention relates to a zinc alloy powder for an anode material in alkaline manganese cells prepared by atomizing a melt composed of purified molten zinc alloyed with 0.001–0.01 wt % of Al, 0.001–0.05 wt % of Bi, 0.01–0.1 wt % of In and 0.01–1.0 wt % of Pb.

DETAILED DESCRIPTION OF THE INVENTION

The zinc alloy powder of the invention is prepared by first mixing high-purity zinc and electrodeposited zinc with specified amounts of alloying elements in a molten state to form an alloy, atomizing the alloy into a powder and gelling the powder, with a bismuth compound added in a specified amount. The thus obtained zinc alloy powder is capable of effectively suppressing the evolution of hydrogen gas and hence contributes to the manufacture of alkaline manganese cells having a longer shelf life and improved storage stability.

As of today, the exact mechanism behind this effect has not been fully elucidated but the following hypothesis may be postulated. When a bismuth compound such as bismuth oxide or bismuth hydroxide is added to a gel of anode, metallic bismuth of high hydrogen overvoltage is substitution precipitated on the surface of the zinc alloy. If metallic bismuth is added to a gel of anode, bismuth dissolving in a very small amount in the electrolyte is substitution precipitated on the surfaces of zinc particles or the particles of metallic bismuth contact the zinc particles within the gel of anode. In either case (substitution precipitation of bismuth on the surfaces of zinc particles or its contact with zinc particles), the bismuth having a nobler potential than zinc will form a local cell relative to zinc.

As is generally held, zinc in an electrolyte will evolve hydrogen gas through an electrochemical reaction, in which a potential difference due to impurities such as iron or the difference in crystal orientation between zinc particles provides a driving force to form a local cell and at sites of the nobler potential on the surfaces of zinc particles, water is electrolyzed to evolve hydrogen gas but zinc and so forth will dissolve at sites of less noble potential. In the local cell formed of zinc and bismuth, noble potential develops on the bismuth surface at noble potential and hydrogen gas will evolve as in the case of the local cell formed by the potential difference between iron and zinc; however, due to the high hydrogen overvoltage of bismuth, the rate of hydrogen gas evolution from bismuth would be markedly suppressed compared to the evolution from iron and zinc.

If more than several thousand ppm of the bismuth compound is added to a gel of zinc alloy powder, the evolution of hydrogen gas is effectively suppressed but, on the other hand, the internal resistance will increase or other phenomena occur to cause adverse effects on the discharge characteristics of the cell to be produced. To avoid this problem, the addition of the bismuth compound must be as small as being on the order of several tens to several hundreds of ppm.

A suitable bismuth compound may be selected from among various grades of reagents and from the class of engineering products. In order to ensure that the evolution of hydrogen gas is effectively suppressed by small addition of bismuth compounds, they must be dispersed uniformly in the gel of anode. To meet this requirement, it is important that the bismuth compound to be added to the gel of anode should not have an average particle size in excess of 10 $\mu$m. If the average particle size of the bismuth compound exceeds 10 $\mu$m, bismuth will not be effectively dispersed within the gel of anodic zinc and in order to suppress the evolution of hydrogen gas effectively, more than several thousand ppm of the bismuth compound must be added but then the above-stated problem may potentially occur. Another requirement that must be met by the bismuth compound to be added is that it have a specific surface area of at least 1 $m^2/g$ as measured by a conventional method such as the BET method. This is to ensure that the bismuth compound will be easily substitution precipitated on the surfaces of zinc particles. If the specific surface area of the bismuth compound is less than 1 $m^2/g$, the substitution reaction will proceed so slowly that the added compound will not be capable of suppressing the evolution of hydrogen gas to a satisfactory extent.

The addition of the bismuth compound is specified to be within the range of 0.0001–0.1% because the intended effect of its addition is not assured below 0.0001% and the discharge performance of the cell is adversely affected above 0.1%.

The zinc alloy powder preferably contains at least one corrosion inhibitor selected from the group consisting of aluminum, indium, bismuth and lead. When alloyed with zinc, aluminum will smooth the surfaces of the alloy particles so as to reduce the reactive surface area and thereby suppress the evolution of hydrogen gas. Indium will enhance the hydrogen overvoltage at the surfaces of the alloy particles by a sufficient extent to suppress the evolution of hydrogen gas due to corrosion in the cell under storage. Similarly, bismuth and lead are capable of suppressing the evolution of hydrogen gas prior to discharging but they can also suppress the evolution of hydrogen gas after discharge. These alloying components are desirably used in the following amounts: 0.001–0.01 wt % of Al; 0.001–0.05 wt % of Bi; 0.01–0.1 wt % of In; and 0.01–1.0 wt % of Pb; outside these ranges, the effectiveness of the alloying components will not be attained.

These elements combine with the bismuth compound including metallic bismuth to provide synergism in remarkably suppressing the evolution of hydrogen gas and thereby providing alkaline cells having a longer shelf life and improved storage stability.

The following examples and comparative examples are provided for the purpose of further illustrating the present invention.

Metallic zinc was melted to a purity of 99.995% and higher and various elements were added and melted in amounts within specified ranges. The melts were atomized by means of a high-pressure gas to prepare zinc alloy powders of 35–200 mesh. The powders were gelled with sodium polyacrylate used as a gelling agent and zinc oxide saturated 40% KOH as an electrolyte. Bismuth compounds having specified powder characteristics were added in specified amounts to the resulting gels so as to prepare sample gels of anode. To measure the amount of hydrogen gas evolution, each sample was incorporated into an LR6 type cell, which was stored at room temperature for one week, had the current collector removed and immersed in a constant-temperature (60° C.) bath. The results of hydrogen gas measurement are shown in Table 1 below.

TABLE 1

|  | No. | Al % | Bi % | In % | Pb % | Bi compound | Average particle size μm | Specific surface area m²/g | Amount of addition % | H₂ gas evolved ml/LR6 · day | Evaluation |
|---|---|---|---|---|---|---|---|---|---|---|---|
| Example | 1 | 0.0030 | 0.0100 | 0.0500 | — | oxide | 3 | 1.2 | 0.001 | 0.01 | ○ |
|  | 2 | 0.0030 | 0.0100 | 0.0500 | — | oxide | 3 | 1.2 | 0.005 | <0.01 | ○ |
|  | 3 | 0.0030 | 0.0100 | 0.0500 | — | oxide | 3 | 1.2 | 0.010 | <0.01 | ○ |
|  | 4 | 0.0030 | 0.0100 | 0.0500 | — | oxide | 3 | 1.2 | 0.050 | <0.01 | ○ |
|  | 5 | 0.0030 | 0.0100 | 0.0500 | — | oxide | 3 | 1.8 | 0.001 | <0.01 | ○ |
|  | 6 | 0.0030 | 0.0100 | 0.0500 | — | oxide | 3 | 1.8 | 0.005 | <0.01 | ○ |
|  | 7 | 0.0030 | 0.0100 | 0.0500 | — | oxide | 3 | 1.8 | 0.010 | <0.01 | ○ |
|  | 8 | 0.0030 | 0.0100 | 0.0500 | — | oxide | 3 | 1.8 | 0.050 | <0.01 | ○ |
|  | 9 | 0.0030 | 0.0100 | 0.0500 | — | hydroxide | 2 | 2.4 | 0.010 | <0.01 | ○ |
|  | 10 | 0.0030 | 0.0100 | 0.0500 | — | metal | 4 | 1.3 | 0.050 | <0.01 | ○ |
|  | 11 | 0.0100 | 0.0500 | 0.0500 | — | oxide | 3 | 1.8 | 0.001 | <0.01 | ○ |
|  | 12 | 0.0100 | 0.0500 | 0.0500 | — | oxide | 3 | 1.8 | 0.005 | <0.01 | ○ |
|  | 13 | 0.0100 | 0.0500 | 0.0500 | — | oxide | 3 | 1.8 | 0.010 | <0.01 | ○ |
|  | 14 | 0.0100 | 0.0500 | 0.0500 | — | oxide | 3 | 1.8 | 0.050 | <0.01 | ○ |
|  | 15 | 0.0100 | 0.0500 | 0.0500 | — | hydroxide | 2 | 2.4 | 0.01 | <0.01 | ○ |
|  | 16 | 0.0100 | 0.0500 | 0.0500 | — | metal | 4 | 1.3 | 0.05 | <0.01 | ○ |
|  | 17 | — | 0.0500 | 0.0500 | 0.0500 | oxide | 3 | 1.8 | 0.005 | <0.01 | ○ |
|  | 18 | — | 0.0500 | 0.0500 | 0.0500 | oxide | 3 | 1.8 | 0.010 | <0.01 | ○ |
|  | 19 | — | 0.0500 | 0.0500 | 0.0500 | oxide | 3 | 1.8 | 0.050 | <0.01 | ○ |
| Comparative Example | 20 | 0.0030 | 0.0100 | 0.0500 | — | oxide | 12 | 0.8 | 0.050 | 0.42 | X |
|  | 21 | 0.0030 | 0.0500 | 0.0500 | — | hydroxide | 20 | 0.5 | 0.050 | 0.56 | X |
|  | 22 | 0.0100 | 0.0100 | 0.0500 | — | oxide | 12 | 0.8 | 0.050 | 0.46 | X |
|  | 23 | 0.0100 | 0.0500 | 0.0500 | — | metal | 18 | 0.6 | 0.050 | 0.48 | X |
|  | 24 | — | 0.0500 | 0.0500 | 0.0500 | oxide | 12 | 0.8 | 0.050 | 0.36 | X |
|  | 25 | — | 0.0500 | 0.0500 | 0.0500 | oxide | 24 | 0.4 | 0.050 | 0.44 | X |

The data in Table 1 show that the gels of anode produced in accordance with the present invention were adapted to evolve sufficiently reduced amounts of hydrogen gas so that they would be useful as anode materials in manufacturing alkaline cells having a longer shelf life and improved storage stability. Thus, the alkaline cells using the anode materials of the invention are suitable as substitutes for the existing low-mercury cells or mercury-free alkaline cells.

As described above, in accordance with the invention, zinc alloy powders which may or may not contain mercury are used as anode materials for cells and bismuth compounds are thereafter added in specified amounts when preparing gels of anode. The benefit of this technology is that even if mercury-free zinc alloy powders are used, the evolution of hydrogen gas can be effectively suppressed to realize the production of alkaline cells having a longer shelf life and improved storage stability.

What is claimed is:

1. An anode active material for use in alkaline manganese cells comprising (a) metallic bismuth or a bismuth compound selected from the group consisting of bismuth oxide and bismuth hydroxide, said metallic bismuth or bismuth compound having an average particle size of no more than 4 μm and optionally a specific surface area of at least 1 m²/g, said metallic bismuth or bismuth compound being in an amount of 0.0001 to 0.1 wt %, and (b) a zinc alloy powder.

2. The anode active material according to claim 1, wherein the zinc alloy powder is alloyed by addition of at least one alloying component selected from the group consisting of Al, Bi, In and Pb.

3. The anode active material according to claim 2, wherein the alloying component is added in an amount of 0.001–0.01 wt % for Al, 0.001–0.05 wt % for Bi, 0.01–0.1 wt % for In or 0.01–1.0 wt % for Pb.

4. The anode active material according to claim 2, wherein said zinc alloy powder is alloyed by addition of three or more alloying components selected from the group consisting of 0.001–0.01 wt % of Al, 0.001–0.05 wt % of Bi, 0.01–0.1 wt % of In and 0.01–1.0 wt % of Pb.

5. The anode active material for use in alkaline manganese cells according to claim 1, wherein said zinc alloy powder is alloyed by addition of three or more alloying components selected from the group consisting of 0.001–0.01 wt % of Al, 0.001–0.5 wt % of Bi, 0.01–0.1 wt % of In and 0.01–1.0 wt % of Pb.

6. The anode active material for use in alkaline manganese cells according to claim 1, wherein said zinc alloy powder comprises 0.0030 wt % of Al, 0.0100 wt % of Bi, 0.0500 wt % of In and the balance being Zn.

7. The anode active material for use in alkaline manganese cells according to claim 1, wherein said zinc alloy powder comprises 0.0100 wt % of Al, 0.0500 wt % of Bi, 0.0500 wt % of In and the balance being Zn.

8. The anode active material for use in alkaline manganese cells according to claim 1, wherein said zinc alloy powder comprises 0.0500 wt % of Bi, 0.0500 wt % of In, 0.0500 wt % of Pb and the balance being Zn.

9. The anode active material for use in alkaline manganese cells according to claim 1, wherein said metallic bismuth or bismuth compound has a specific surface area of at least 1 m²/g, which results in a reduction of hydrogen gas evolution.

10. The anode active material for use in alkaline manganese cells according to claim 1, wherein said metallic bismuth or bismuth compound is in an amount of 0.0001 to 0.05 weight %.

11. A gel of anode material for use in alkaline manganese cells which is produced by a method comprising mixing under agitation a zinc alloy powder with an electrolyte made of an aqueous potassium hydroxide solution, a gelling agent and metallic bismuth or a bismuth compound selected from the group consisting of bismuth oxide and bismuth hydroxide, said metallic bismuth or bismuth compound having an average particle size of no more than 10 μm and optionally a specific surface area of at least 1 m²/g, said zinc alloy powder being prepared by atomizing a melt comprising purified molten zinc alloyed with one or more alloying components, wherein an amount of gas evolution measured by incorporating a sample into an LR6 type cell, which is stored at room temperature for one week, having a current collector removed and immersed in a constant-temperature bath of 60° C. is less than 0.01 ml/LR6·day.

12. The gel of anode material according to claim 11, wherein the zinc alloy powder is alloyed by addition of at least one alloying component selected from the group consisting of 0.001 to 0.01 wt % of Al, 0.001 to 0.05 wt % of Bi, 0.01 to 0.1 wt % of In and 0.01 to 1.0 wt % of Pb.

13. The gel of anode material according to claim 11, wherein said zinc alloy powder is alloyed with three or more alloying components selected from the group consisting of 0.001–0.01 wt % of Al, 0.001–0.05 wt % of Bi, 0.01–0.1 wt % of In and 0.01–1.0 wt % of Pb.

14. The gel of anode material for use in alkaline manganese cells according to claim 11, wherein said zinc alloy powder comprises 0.0030 wt % of Al, 0.0100 wt % of Bi, 0.0500 wt % of In and the balance being Zn.

15. The gel of anode material for use in alkaline manganese cells according to claim 11, wherein said zinc alloy powder comprises 0.0100 wt % of Al, 0.0500 wt % of Bi, 0.0500 wt % of In and the balance being Zn.

16. The gel of anode material for use in alkaline manganese cells according to claim 11, wherein said zinc alloy powder comprises 0.0030 wt % of Al, 0.0100 wt % of Bi, 0.0500 wt % of In and the balance being Zn.

17. The gel of anode material according to claim 11, wherein said metallic bismuth or bismuth compound has a specific surface area of at least 1 $m^2/g$, which results in a reduction of hydrogen gas evolution.

18. An anode active material for use in alkaline manganese cells comprising (a) metallic bismuth or a bismuth compound selected from the group consisting of bismuth oxide and bismuth hydroxide, said metallic bismuth or bismuth compound having an average particle size of no more than 10 $\mu$m and optionally a specific surface area of at least 1 $m^2/g$, said metallic bismuth or bismuth compound being in an amount of 0.0001 to 0.1 wt %, and (b) a zinc alloy powder, wherein an amount of gas evolution measured by incorporating a sample into an LR6 cell, which is stored at room temperature for one week, having a current collector removed and immersed in a constant-temperature bath of 60° C. is less than 0.01 ml/LR6·day.

* * * * *